3,634,495
PRODUCTION OF ACIDS AND ESTERS
Arien Kwantes and Bernhard Stouthamer, Amsterdam, Netherlands, assignors to Shell Oil Company, New York, N.Y.
Filed July 10, 1969, Ser. No. 840,661
Claims priority, application Great Britain, Nov. 15, 1968, 54,330/68
Int. Cl. C07c *51/12*
U.S. Cl. 260—488 K                             10 Claims

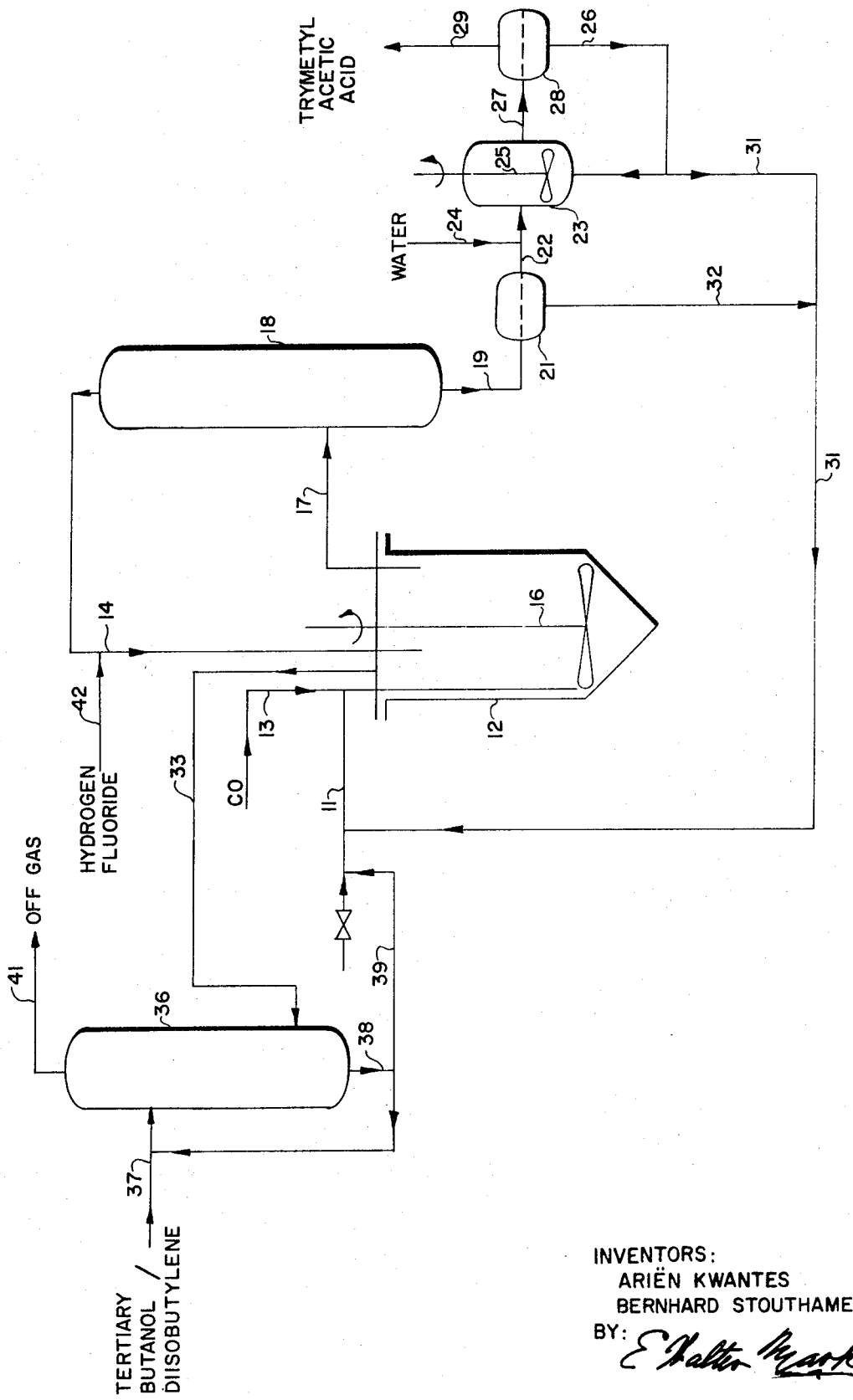

ABSTRACT OF THE DISCLOSURE

Carboxylic acids and esters are prepared by reacting carbon monoxide with an alcohol in the presence of water-containing liquid hydrogen fluoride.

BACKGROUND OF THE INVENTION

This invention relates to the production of organic acids and esters from starting materials comprising carbon monoxide and monohydric alcohols.

It is known that trimethyl acetic acid can be obtained by contacting mixtures containing steam, carbon monoxide and the primary alkanol, isobutanol, with certain catalysts, for example, activated charcoal, according to processes such as the one described in U.S. Pat. 1,995,930, issued to Alfred T. Larson. These processes have, however, not led to practical scale application. This is attributable in part to the exceedingly high pressures employed therein, generally in excess of 500 atmospheres, which makes too heavy a demand on practical scale equipment. Also, the high temperatures required to effect the reaction satisfactorily, 275–375° C., lead to yields of the desired carboxylic acids which are too low to be commensurate with commercial operation.

U.S. Pat. 3,005,846, issued to Bernard S. Friedman et al., describes the carbonylation of olefins in the presence of a hydrogen fluoride-alcohol mixture at conditions under which no reaction of the alcohol to acid takes place; the alcohol rather reacting to form an ester with the acid formed by carbonylation of the olefin.

STATEMENT OF THE INVENTION

It has now been found that carboxylic acids are produced with improved efficiency by contacting a monohydric alcohol with carbon monoxide, in the presence of a liquid hydrogen fluoride catalyst, at a temperature of from about 20° C. to about 90° C. and a partial pressure of carbon from about 1 kg./cm.$^2$ to about 75 kg./cm.$^2$. Esters of the thus formed acids and the starting alcohols are formed to varying extent depending on the relative rates of the acid formation and the esterification reactions. In a preferred embodiment, the catalyst employed is liquid hydrogen fluoride containing water in a controlled amount of from about 1% to about 15% by weight. The invention will be further described below with reference to the attached drawing wherein the single figure represents more or less diagrammatically one form of apparatus suitable for continuously carrying out the process of the invention.

DETAILED DESCRIPTION OF THE INVENTION

Catalyst

High yields of the desired carboxylic products are obtained when using as catalyst in the process of the invention liquid hydrogen fluoride containing a minor amount of water. Water in an amount of from about 1 to about 15% by weight is suitably included in the liquid hydrogen fluoride catalyst. Particularly suitable are liquid hydrogen fluoride catalysts containing from about 4% to about 12% by weight water. It is essential to maintain the water content of the catalyst within the prescribed range. Water is produced in a side reaction whereby a small part of the monohydric alcohol is converted into acids having molecular weights higher than that of the acid corresponding to the alcohol. For example, a small part of tertiary butyl alcohol is converted into carboxylic acids having nine carbon atoms per molecule. Simultaneously, water is formed which dilutes the liquid hydrogen fluoride. Water is also formed as a result of ester formation. Generally, dilution caused by water formation may be acceptable in a once-through process, however, in a continuous process in which liquid hydrogen fluoride is recirculated, water builds up gradually, in the absence of some method of control, the liquid hydrogen fluoride becoming unacceptably dilute.

Control of the catalyst water content can be effected by conventional means, such as separation of a water-rich fraction from the recycle catalyst stream. In a preferred aspect of the invention, a water-removing compound, that is a compound which combines with water at the conditions prevailing in the reactor, is added to the reaction mixture to maintain catalyst composition.

Any suitable water-removing compound may be introduced into the reactor. Preferably, a water-removing compound is used which, under the reaction conditions employed, is converted to the desired carboxylic acid product. This embodiment is attractive in that the desired carboxylic acid is not contaminated with products formed by water removal and yield of the desired product is improved.

Suitable water-removing compounds comprise carboxylic acid anhydrides, carbonyl halides such as carbonyl chloride or fluoride and olefins. Olefins are preferred; easily forming carboxylic acids with water and carbon monoxide at the reaction conditions. Especially preferred as water removing compound are the mono-olefins which are converted under the reaction conditions to the desired carboxylic acid product.

Alcohol charge

The organic charge reacted with carbon monoxide in accordance with the invention comprises organic compounds containing one aliphatic carbinol group as the sole reactive group. Suitable organic compounds reacted with carbon monoxide in accordance with the invention comprise the alcohols represented by the empirical formula:

R—OH wherein R represents a hydrocarbyl group containing at least three carbon atoms attached to the oxygen atom through an aliphatic carbon atom. R preferably represents a saturated hydrocarbon radical, either alkyl or cycloalkyl such as propyl, n-butyl, i-butyl, tert. butyl, amyl, hexyl, heptyl, octyl, nonyl, decyl and corresponding cycloalkyls and hydrocarbon-substituted cycloalkyls. R most preferably represents a secondary or tertiary alkyl.

Mixtures of two or more of the above-defined alcohols may be charged to the process of the invention. Examples of alcohols of the above-defined class are: n-propanol, n-butanol, tert.-butanol, isopropanol cyclohexanol, methylisobutyl carbinol, cyclohexanol, methtylisobutyl carbinol, cyclopentyl carbinol, the normal, secondary and tertiary hexanols, heptanols, octanols, nonanols and decanols. A suitable charge material comprises the alcoholic products of the Oxo synthesis. Alcohols having from three to twenty carbon atoms to the molecule constitute preferred charge materials to the process. Of the suitable alcohol charge materials those wherein a hydroxyl group is directly attached to a secondary or tertiary carbon atom are particularly preferred.

The alcohol charged to the process of the invention need not necessarily be pure. Impurities in the amounts generally encountered in these materials as obtained commercially have no adverse effect upon the efficiency of the process. Such impurities comprise, for example, residual hydrocarbon material from which the alcohols are derived.

As stated hereinbefore, alcohols are converted into acids and/or esters, which product predominates depends in part upon the alcohol charged. Little or no esterification takes place when the acid is formed at a high reaction rate. However, when the acid is formed at a relatively low rate, it is being formed in the presence of a relatively large proportion of alcohol and therefore will more easily esterify.

The use of a primary alcohol will generally result in a secondary acid having a chemical structure corresponding to that obtained by replacing the starting hydroxyl group with hydrogen and substituting a carboxyl group for a hydrogen attached to the carbon adjacent to the hydroxy methyl group of the starting material. However, since straight-chain primary alcohols generally react under the conditions of the invention but relatively slowly and incompletely, the acid formed, a 2-methyl straight-chain carboxylic acid, is in its turn subsequently converted into the ester. For example, a small part of n-butanol is converted into the n-butyl ester of 2-methyl butanoic acid, the acid itself not being an end product.

Branched-chain primary alcohols react faster and more completely with carbon monoxide than straight-chain primary alcohols do. However, the reaction is still relatively slow. A large part of the acid formed in converted into ester. For example, iso-butanol is first converted, for the greater part, into trimethyl acetic acid and a large part of this acid is subsequently esterified to form isobutyl trimethyl acetate. The more reactive branched-chain primary alcohols are more suitable charge materials.

When a secondary or a tertiary alcohol is used as the starting material the carboxylic acid produced will be the acid obtained by the substitution of a carboxylic acid group for the hydroxyl group. For example, butanol-2- is converted with carbon monoxide into 2-methyl butanoic acid and isopropyl alcohol into isobutyric acid.

Secondary alcohols react relatively fast with carbon monoxide under the conditions of the present process, so that only a relatively small part of the acids formed is converted into esters. Tertiary alcohols react very fast with carbon monoxide, only acids and no esters being formed. The process according to the invention is therefore particularly attractive for converting tertiary butanol into trimethyl acetic acid, an important starting material for the preparation of a great variety of organic compounds. Furthermore, the acids and/or esters are obtained in a high yield when the preferred secondary and tertiary alcohols are used.

Carbon monoxide reactant

Preferably substantially pure carbon monoxide is used. The process according to the invention, however, is not restricted as regards the source of the carbon monoxide-containing gas to be used. The carbon monoxide-containing gas may be any mixture of carbon monoxide with one or more inert gases, such as for example hydrogen, nitrogen or gaseous alkanes. The carbon monoxide is preferably present in a gas containing at least 50% by volume of carbon monoxide.

Reaction conditions

The process of the invention is preferably carried out at a carbon monoxide partial pressure in the range of from about 5 to about 50 kg./cm.$^2$ and in particular in the range of from 10 to 40 kg./cm.$^2$.

The process is preferably carried out at a temperature in the range of from 20° to 90° C., but temperatures outside the latter range may be used as well. The desired carboxylic products are obtained in very high yield when the process is carried out at a temperature in the range of from 40° to 70° C.

The molar ratio between hydrogen fluoride catalyst and alcohol may vary within wide limits. In order to ensure a sufficiently high reaction rate this ratio is, as a rule, chosen not lower than 2:1, and for economic reasons not higher than 20:1. The said ratio is preferably in the range of from 5:1 to 15:1. At a ratio of about 10:1 very favorable results are obtained.

The yield of carboxylic acid and/or ester is favorably influenced when the reaction mixture is vigorously stirred. Therefore, said alcohol is preferably caused to react with carbon monoxide in a reactor provided with a stirrer having a power input of at least 0.5 h.p. per m.$^3$ and in particular between 1 and 4 h.p. per m.$^3$ liquid reactor contents. Mixing is further improved, when the reaction is carried out in a reactor provided with one or more baffles. Very favorable results are obtained with a stirred reactor provided with four baffles.

When the process according to the present invention is carried out continuously, it preferably comprises the steps of:

(a) introducing into a reactor liquid hydrogen fluoride, the monohydric alcohol to be converted, carbon monoxide and a minor amount of a suitable mono-olefin as water-removing compound;

(b) separating the liquid reactor effluent into a phase comprising carboxylic acid and/or ester and a phase containing hydrogen-fluoride; and (c) recycling at least part of the said hydrogen-fluoride-containing phase to the reactor in step (a).

The separation of the carboxylic acid/ester phase from the liquid reactor effluent in step (b) may be carried out in any desired manner. In view of the volatility of hydrogen fluoride, the separation in step (b) is preferably carried out with the aid of fractionation. This fractionation preferably comprises the steps of:

($b_1$) separating the reactor effluent by fractionation into an overhead fraction comprising gaseous hydrogen fluoride, and a bottom fraction comprising hydrogen fluoride, carboxylic acid/ester and water;

($b_2$) cooling the said overhead fraction to obtain liquefied hydrogen fluoride for recycling in step (c);

($b_3$) recovering from the said bottom fraction carboxylic acid and/or ester as well as aqueous hydrogen fluoride; and ($b_4$) recycling at least part of the water-containing liquid hydrogen fluoride obtained in step ($b_3$) to the reactor in step (a).

Although the fractionation can in principle be carried out at any pressure, it is preferably performed at substantially atmospheric or slightly increased pressure. Fractionation at a slightly increased pressure has as an advantage that by using ordinary cooling water, which has a temperature of, for instance, from 10 to 30° C., the gaseous hydrogen fluoride obtained as overhead fraction can be condensed in a simple manner. Fractionation is preferably carried out at a pressure in the range of from 3 to 6 kg./cm.$^2$. If desired, pressures higher than 6 kg./cm.$^2$ may also be used.

The crude reaction product obtained as a bottom fraction in the fractionation contains monocarboxylic acids and/or esters, hydrogen fluoride and water.

The fractionation is preferably carried out in such a manner that in the bottom fraction the ratio between hydrogen fluoride and water is substantially equal to the azeotropic composition of these compounds. As is known, the hydrogen fluoride-water azeotrope contains 38% w. hydrogen fluoride and boils at 112° C. at atmospheric pressure. By removing hydrogen fluoride during fractionating in an amount such that this azeotropic composition is substantially obtained, separation occurs in the bottom fraction, resulting in an acid and/or ester phase, and an aqueous hydrogen fluoride phase. By phase separation in a phase separator carboxylic acids and aqueous hydrogen fluoride can be recovered from the bottom fraction in a simple manner. This aqueous hydrogen fluoride is preferably recycled to the reactor in step (a).

The material comprising carboxylic acid and/or ester obtained in step ($b_3$) is preferably washed with water, thus removing water-soluble compounds, particularly hydrogen fluoride. Washing is preferably carried out in a rotating disc contactor. The material to be washed and water are preferably conducted through the said contactor in counter-current. The water used to wash the said material is suitably at least partly and preferably wholly recycled to the reactor in step (a). This minimizes losses of hydrogen fluoride. Additional water-removing compound generally must be added to compensate for wash water recycle.

The washed material, consisting almost completely of carboxylic acids and/or esters, may further be purified by distillation. This distillation is preferably carried out at atmospheric or sub-atmospheric pressure.

In step (a) not only a liquid product is removed from the reactor, but also an off-gas, which in addition to carbon monoxide mainly contains hydrogen fluoride and gaseous components formed by side reactions in the preparation of the acids or which were passed into the reactor together with the components to be converted. The hydrogen fluoride can, in a simple way, be recovered almost completely from the off-gas by cooling the said off-gas, preferably at the pressure prevailing in the reactor. The liquid hydrogen fluoride thus formed is preferably recycled to the reactor. If desired, the off gas may be combined with the overhead product obtained in the fractionation in ($b_1$) and then cooled together. This partly purified off-gas, however, cannot as a rule be vented as such to the atmosphere because the off-gas contains harmful compounds, particularly traces of hydrogen fluoride and carbon monoxide. Hydrogen fluoride is preferably recovered from the reactor off-gas obtained in step (a) by contacting the said off-gas, in particular after cooling and removal of liquefied hydrogen fluoride, with a hydrogen fluoride acceptor. As hydrogen fluoride acceptor are preferably used liquids with satisfactory solvent power from hydrogen fluoride.

According to a very suitable embodiment of the present process the hydrogen fluoride acceptor used is the alcohol to be converted, the alcohol used for washing the off-gas then being introduced into the reactor.

After removal of hydrogen fluoride from the off-gas in the process according to the invention the off-gas is preferably burnt, thus preventing pollution of the air with carbon monoxide and gaseous hydrocarbons.

The process of the invention as it is applied to the production of a typical carboxylic acid, trimethyl acetic acid from tertiary butanol with diisobutene as water-removing olefin, is further described with reference to the figure.

Tertiary butanol and diisobutene are introduced via line 11 into reactor 12. Carbon monoxide is supplied via line 13 and a recycle stream of liquid hydrogen fluoride is supplied via line 14 to reactor 12. Reactor 12 is equipped with stirrer 16. Liquid is withdrawn from reactor 12 via line 17 and introduced into a fractionation column, 18. From column 18 a bottom fraction comprising crude acid, hydrogen fluoride and water is withdrawn via line 19 and conducted to phase separator 21. In phase separator 21, an upper phase, containing crude trimethyl acetic acid and a minor amount of acids having more carbon atoms per molecule than the latter acid, is separated and conducted via line 22 to mixing vessel 23, equipped with mixer 25 in which the crude acid is washed with water. This water is introduced into vessel 23, partly via line 26, originating from the process, and partly as make-up water supplied via line 24. The mixed liquids are withdrawn from vessel 23 via line 27 and introduced into phase separator 28, from which the upper phase consisting of crude trimethyl acetic acid is withdrawn via line 29. The washed acid which is now substantially free of hydrogen fluoride may be further purified by means of distillation under vacuum, if desired.

The water used for washing in mixing vessel 23 contains hydrogen fluoride and is withdrawn from phase separator 28 via line 26, partly to vessel 23 and partly via line 31 to line 11 to recover hydrogen fluoride. The lower phase present in phase separator 21 and consisting of a hydrogen fluoride-water azeotropic mixture, is withdrawn from separator 21 via line 32 and introduced into line 31. The amount of diisobutene supplied via line 11 is sufficient to remove the water formed inside reactor 12 as well as the water introduced into the reactor via line 31.

The overhead fraction of column 18 is substantially pure gaseous hydrogen fluoride; after indirect cooling with cooling water and liquefaction it is conducted via line 14 to reactor 12.

Via line 33 an off-gas containing hydrogen fluoride and carbon monoxide is withdrawn from reactor 12 and introduced into scrubber 36, in which it is scrubbed countercurrently with tertiary butanol introduced into scrubber 36 via line 37. Tertiary butanol containing hydrogen fluoride is withdrawn from scrubber 36 via line 38 and partly recirculated to line 37 and partly introduced via line 39 into line 11. Hydrogen fluoride-free off-gas is discharged from scrubber 36 via line 41. Make-up hydrogen fluoride is added via line 42.

The process of the invention is further elucidated by way of the following examples. The experiments described in Examples I–V have been carried out in a reactor as shown on the figure and made of "Hastelloy C" (a registered trademark). The carbon monoxide pressure was 25 kg./cm.$^2$ and the temperature 60° C. The reactor volume was 1000 ml. The experiments were carried out under the same conditions, unless otherwise stated.

EXAMPLE I

The reactor was charged with 250 ml. of liquid hydrogen fluoride containing 5% w. of water. Then 200 ml. of tertiary butanol were gradually introduced into the reactor during a time of 90 minutes. The alcohol contained 5% w. of n-pentane to make it pumpable at ambient temperature.

The liquid reactor contents were analysed when all alcohol had been charged. It was found that 97% of the tertiary alcohol was converted into trimethyl acetic acid and 3% into acids containing six to nine carbon atoms per molecule. Esters were not formed.

EXAMPLE II

When water-free secondary butanol was used as the starting material, 93% of the secondary alcohol was converted, 75% into 2-methyl butanoic acid, 16% into the ester derived from the latter acid and the secondary alcohol and 2% into trimethyl acetic acid.

EXAMPLE III

When iso-butanol was used as the starting material, 80% of it was converted, 10% into trimethyl acetic acid and 70% into the ester derived from this acid and the primary alcohol.

EXAMPLE IV

In four experiments tertiary butanol containing 5% w. n-pentane was converted into acids. The hydrogen fluoride was water-free in one experiment and contained 5, 10 and 20% w. of water in the other three experiments, respectively. The results of these experiments are presented in the table.

TABLE

| Exp. No. | Water content of HF, percent w. | Yield, percent m. | | | | |
|---|---|---|---|---|---|---|
| | | $<C_5$ acids | Trimethyl acetic acid | $C_6-C_8$ acids | $C_9$ acids | $C_{13}$ acids |
| 1 | 0 | 0.2 | 95.5 | 4.0 | 0.3 | 0 |
| 2 | 5 | 0.2 | 97.0 | 2.5 | 0.3 | 0 |
| 3 | 10 | 0.2 | 97.5 | 0.8 | 1.5 | 0 |
| 4 | 20 | 0.2 | 53.0 | 3.5 | 30.0 | 13.3 |

The alcohol was fully converted into the acids mentioned in the table. The results presented show that the presence of 5 and 10% w. of water in the liquid hydrogen fluoride has a favorable effect on the yield of trimethyl acetic acid. However, the presence of 20% w. of water leads to the formation of $C_9$ and $C_{13}$ acids and causes the trimethyl acetic acid yield to decrease.

EXAMPLE V

In a continuous operation in a unit as shown in the figure 120 g. hydrogen fluoride, 101 g. tertiary butanol, 35.5 g. isobutene and 9.7 g. water were fed per hour to a reactor having a volume of 0.25 litre, made of "Hastelloy C" (a registered trademark), provided with 4 baffles and a double-blade propeller stirrer. The butanol contained 3.8% w. of water to make it pumpable at ambient temperature. The temperature of the reactor contents was maintained at 60° C., the carbon monoxide pressure was 26 kg./cm.$^2$, pure carbon monoxide being used.

The reactor liquid effluent was separated into liquid hydrogen fluoride and carboxylic acids. The acids were washed with water and the spent wash water was returned to the reactor. The acids were further separated by means of distillation. It was found that the conversion of the alcohol and the isobutene was 100%, 90% mole into trimethyl acetic acid and 10% mole into acids having a molecular weight higher than that of trimethyl acetic acid. The total acid production amounted to 200 g./h.

The water balance of the material entering the reactor and the material leaving the reactor was as follows:

| | G./h. | | G./h. |
|---|---|---|---|
| Water present in recycled hydrogen fluoride. | 9.70 | Water present in liquid leaving the reactor. | 9.70 |
| Water present in alcohol. | 3.84 | Water removed by isobutene. | 11.00 |
| Water present in wash water. | 5.60 | | |
| Water formed inside the reactor. | 1.56 | | |
| Total | 20.70 | Total | 20.70 |

This experiment shows that isobutene is capable of removing water under the conditions at which tertiary butanol is converted into trimethyl acetic acid.

EXAMPLE VI

This experiment was carried out under the same conditions as the experiment described in Example V. In a continuous operation 120 g. hydrogen fluoride and 101 g. tertiary butanol were fed per hour to the reactor. In order to remove by-product and wash water, 2.8 g. isobutene was fed to the reactor as well.

An analysis of the material leaving the reactor showed that the conversion of the alcohol and isobutene was 100%, 97.5% mole into trimethyl acetic acid and 2.5% mole into acids having nine or more carbon atoms per molecule.

The water balance of the material entering the reactor and the material leaving the reactor was as follows:

| | G./h. | | G./h. |
|---|---|---|---|
| Water present in recycled hydrogen fluoride. | 9.7 | Water present in liquid leaving the reactor. | 9.7 |
| Water present in wash water. | 0.6 | Water removed by isobutene. | 0.9 |
| Water formed inside the reactor. | 0.3 | | |
| Total | 10.6 | Total | 10.6 |

This experiment shows that isobutene is also capable of removing small quantities of water.

We claim as our invention:

1. The process for the synthesis of carboxylic acids and esters which comprises reacting an alcohol represented by the empirical formula R—OH, wherein R represents an aliphatic hydrocarbyl group containing at least three carbon atoms, in the liquid phase with carbon monoxide in the presence of catalyst consisting essentially of liquid hydrogen fluoride containing from about 1% to about 15% by weight of water, at a temperature of from about 20° C. to about 90° C. and at a carbon monoxide partial pressure of from about 1 kg./cm.$^2$ to about 75 kg./cm.$^2$ and thereafter separating carboxylic acids and esters from the reaction.

2. The process in accordance with claim 1 wherein the molar ratio of hydrogen fluoride catalyst to alcohol is between about 2 to 1 and about 20 to 1.

3. The process in accordance with claim 2 wherein said molar ratio of hydrogen fluoride catalyst to alcohol is between about 5 to 1 and about 15 to 1 and said hydrogen fluoride catalyst contains from about 4% to about 12% by weight of water.

4. The process in accordance with claim 3 wherein said R is selected from the group consisting of secondary and tertiary alkyls of from 3 to 20 carbon atoms.

5. The continuous process for the production of carboxylic acids and esters from carbon monoxide and an alcohol represented by the empirical formula R—OH, wherein R represents an aliphatic hydrocarbyl group of from 3 to 20 carbon atoms, which comprises subjecting said carbon monoxide and alcohol to vigorous agitation in a reaction zone in the presence of a catalyst consisting essentially of liquid hydrogen fluoride containing from about 1% to about 15% by weight of water at a temperature of from about 10° C. to about 125° C. and a carbon monoxide partial pressure of from about 1 kg./cm.$^2$ to about 75 kg./cm.$^2$ thereby reacting said carbon monoxide and alcohol to form acids and esters, continuously removing from said reaction zone reaction product comprising acids, esters, water and hydrogen fluoride, subjecting said reaction product to fractionation thereby separating a vapor fraction comprising hydrogen fluoride, and a liquid fraction comprising acids, esters, water and hydrogen fluoride, subjecting said liquid fraction to phase separation thereby recovering a phase comprising acids and esters and a phase comprising hydrogen fluoride and water.

6. The process in accordance with claim 5 wherein at least a portion of said vapor fraction comprising hydrogen fluoride is condensed and returned to the reaction zone.

7. The process in accordance with claim 6 wherein said phase comprising acids and esters is further purified by washing with water.

8. The process in accordance with claim 7, wherein the water content of said liquid hydrogen fluoride catalyst is controlled between about 4% and about 12% by weight by the controlled addition of a water-removing compound selected from the group consisting of olefins.

9. The process in accordance with claim 8 wherein the molar ratio of hydrogen fluoride catalyst to alcohol is between about 5 to 1 and about 15 to 1.

10. The process in accordance with claim 9 wherein said alcohol is tertiary butanol and said acid is trimethyl acetic acid.

References Cited

UNITED STATES PATENTS

| | | | |
|---|---|---|---|
| 1,946,255 | 2/1934 | Carpenter | 260—532 |
| 2,003,477 | 6/1935 | Woodhouse | 260—532 |

LORRAINE A. WEINBERGER, Primary Examiner

V. GARNER, Assistant Examiner

U.S. Cl. X.R.

260—410, 410.9 R, 413, 468 CB, 514 C, 532